Jan. 13, 1970    M. ROTH ET AL    3,489,098
RECIPROCATING PUMP HAVING AN IMPROVED SEAL AND METHOD
OF MANUFACTURE THEREFOR
Filed March 18, 1968      2 Sheets-Sheet 1

INVENTORS
MORRIS ROTH
WILLIAM K. MADDOX
DON R. WILSON

BY

*Burns, Doane, Benedict, Swecker & Mathis*
ATTORNEYS

INVENTORS
MORRIS ROTH
WILLIAM K. MADDOX
DON R. WILSON

BY

*Burns, Doane, Benedict, Swecker & Mathis*
ATTORNEYS

United States Patent Office 3,489,098
Patented Jan. 13, 1970

3,489,098
RECIPROCATING PUMP HAVING AN IMPROVED SEAL AND METHOD OF MANUFACTURE THEREFOR
Morris Roth, William K. Maddox, and Don R. Wilson, Duncan, Okla., assignors to Halliburton Company, Duncan, Okla., a corporation of Delaware
Filed Mar. 18, 1968, Ser. No. 713,800
Int. Cl. F04b 19/22, 21/00; F01b 29/08
U.S. Cl. 103—153                          13 Claims

ABSTRACT OF THE DISCLOSURE

A reciprocating pump which includes a housing having a pumping chamber. A piston movably mounted in the housing extends partially into the chamber for axial reciprocation relative thereto. A packing bore in the housing surrounding the piston includes a closed end within the housing and an open end facing outwardly of the housing. A replaceable packing sleeve positioned with the packing bore has an exterior surface contacting adjacent portions of the housing and an interior surface generally parallel to and spaced from the piston. Compressible packing material is interposed between the shaft and the sleeve. The packing sleeve is fixedly secured in the bore by retaining means. At least one peripherally extending recess in the exterior surface receives a compressible annular seal ring sealingly contacting adjacent portions of the housing to prevent liquid creeping between the packing sleeve and the housing.

A method of manufacture of a pump which is provided with a metal packing sleeve. The method includes the steps of producing a hole in the packing sleeve while in an initial unhardened condition. The metal sleeve is then hardened and subsequently slid into a packing bore in the pump housing until the hole in the sleeve is aligned axially with a clearance hole in the housing which intersects the bore. The sleeve is then rotated to align the hole radially with the clearance hole and a lubrication line is passed through the clearance hole at least partially into the hole in the sleeve. A closure is applied to fix the sleeve in the bore.

BACKGROUND OF THE INVENTION

This invention relates to a reciprocating pump having an improved shaft seal and to a method of assembly therefor. In particular, the invention relates to a reciprocating pump of the multiplex type mounted in a housing. Packing material is retained against each shaft by a replaceable packing sleeve mounted in the housing.

In performing certain oil field pumping operations involving the use of liquids containing abrasive particles, such as for example in fracturing and cementing operations, it is often desirable to utilize reciprocating pumps. One type of reciprocating pump common in oil field practice is the so-called multiplex pump provided with a plurality of separate pumping heads often referred to as "fluid ends." Each fluid end comprises a unitary housing having an enclosed, hollow pumping chamber. A cylindrical piston movably mounted in the housing, extends partially into the chamber for reciprocating movement relative thereto in order to draw liquid in through an inlet valve and pump it out through an outlet valve. In order to maintain the chamber in a liquid-tight condition, it is common to interpose packing material between the piston and the housing at some suitable location.

However, in the use of pumps of the type described, one significant problem has arisen in connection with most of the packing constructions presently in use. This problem arises from the tendency of a portion of the liquid being pumped to creep between the packing material and the housing at the very high pumping pressures commonly involved in oil field operations. In this event, the combination of the highly abrasive nature of the liquid and the high pressure under which it is acting, has been found to cause rapid abrading of the relatively soft metal of which the housing is formed. As the housing becomes progressively worn away, the seal provided by the packing rapidly fails and it eventually becomes necessary to scrap the entire housing unit at considerable expense.

Another problem arising in the use of multiplex pumps is the difficulty of access to change parts for one fluid end due to the presence of the adjacent fluid ends constituting the pump together with the associated reciprocating machinery. With the remaining fluid ends still in use, it may be dangerous or impossible to gain access to one damaged fluid end by proceeding axially from the pumping side of the fluid end.

One previous approach to protecting a housing surrounding a reciprocating shaft exemplified by U.S. Patent No. 1,681,444 has been to provide a replaceable, externally threaded metal packing sleeve interposed between the housing and the packing. However, this prior structure was not specifically directed to overcoming the problems posed in field pumping operations at unusually high pressures, wherein some portion of the abrasive liquid would be likely to become forced between the housing and the packing sleeve, with the same disadvantageous results presently considered. Additionally, this prior device required axial removal and adjustment of the sleeve from the pumping end of the housing which would present insuperable difficulties in a multiplex oil field pump having access restrictions of the type previously described.

Another problem arising with the use of an externally threaded packing sleeve might occur under circumstances (sometimes encountered) requiring lubricating fluid to be supplied to the piston and packing through aligned channels in the housing and sleeve. Utilizing a threaded packing sleeve with a pre-bored lubricating channel in the sleeve, it would be extremely difficult to insure that the lubricating hole was axially and radially aligned with the corresponding channel in the housing at the same time that the packing sleeve became fully threaded into the housing bore. One approach to this alignment problem would be to bore the hole in the sleeve after it had been fully threaded into the bore. However, this approach would necessitate using a packing sleeve which had not been hardened, and which thus might reduce the effective life in use of the packing sleeve.

SUMMARY OF INVENTION

It is therefore a general object of the invention to provide a reciprocating pump having an improved seal, which obviates or minimizes problems of the type previously noted.

It is a particular object of the invention to provide a reciprocating pump particularly suitable for oil field operations utilizing abrasive fluid, wherein the adverse effects of creepage of abrasive fluid externally of the packing are minimized.

It is a further object of the invention to provide a reciprocating oil field pump having a low cost packing sleeve for retaining packing material about the pump shaft, wherein the sleeve may be replaced as it becomes worn without requiring replacement of major portions of the pump housing.

It is one more object of the invention to provide a reciprocating pump having a replaceable packing sleeve of hardened metal in which alignment of a lubricating hole in the packing sleeve with a corresponding hole in the housing may be easily accomplished.

A preferred embodiment of the invention intended to accomplish at least some of the foregoing objects includes a reciprocating pump having a housing provided with an axially extending pumping chamber. A piston, movably mounted in the housing, extends partially into the chamber for axially reciprocating motion relative thereto. A packing bore in the housing surrounding the piston includes a closed radial end within the housing and an open end facing outwardly of the housing. A replaceable packing sleeve positioned within the packing bore includes an exterior surface abuttingly contacting adjacent portions of the housing defining the bore and an interior surface generally parallel to and spaced from the piston. Packing material is interposed between the piston and the interior surface of the sleeve and retaining means are provided for connecting the sleeve in fixed relation to the housing. In a particular feature of the invention, a peripherally extending recess is provided in the exterior surface of the sleeve. The recess partially receives a compressible annular seal ring which sealingly contacts adjacent portions of the housing defining the packing bore. The annular seal ring prevents creepage of any portion of the liquid being pumped between the packing sleeve and the housing, to prevent abrasion thereof.

In a further apparatus aspect of the invention, the piston and bore are generally of circular cross-section. The sleeve comprises a generally tubular sleeve body of hardened metal, slidable into the packing bore through the open end thereof until one radial end of the sleeve body abuttingly contacts the closed end of the packing bore. The packing bore is additionally provided with an internally threaded portion adjacent its open end. The retaining means includes an annular retaining body having an externally threaded, peripheral portion engaging the threaded portion of the packing bore, and an internal shoulder abutting an adjacent other radial end of the sleeve body.

To provide for lubrication of the piston in its passage through the packing, a radially extending lubrication hole is provided in the sleeve body. A radially extending clearance hole in the housing intersecting the packing bore is aligned with the lubrication hole in the sleeve body. A lubrication line passing through the clearance hole and extending at least partially into the lubrication hole in the sleeve, delivers lubricant to the packing and piston.

Of further significance is the provision of structure for compressing the packing. For this purpose, an annular mounting member surrounding and spaced from the piston and having an externally threaded peripheral portion, is releasably supported in fixed axially spaced relation from the opened end of the bore by bridging means fixedly connected with the housing. An annular compression member surrounding and spaced from the piston includes one axial end portion abuttingly contacting the packing. An opposite internally threaded axial end portion of the compression member overlaps and is threadingly engaged with the threaded portion of the mounting member. Axial unthreading motion of the compression member from the mounting member causes axial separation of the compression member from the mounting member to cause axial compression of the packing to increase the seal.

Another aspect of the invention resides in a method of manufacture of a reciprocating pump provided with a metal, packing sleeve positioned in a packing bore in a housing of the pump. The packing bore extends in an axial direction and includes one closed radial end and one open end, with the housing including a radial clearance hole intersecting the bore at a location spaced axially from the closed end. The method comprises the steps of producing a radial hole in the packing sleeve prior to positioning in the packing bore, with the sleeve in an initially unhardened condition and with the hole positioned at an axial spacing from one end of the sleeve equal to the axial spacing of the clearance hole from the closed end of the packing bore. The metal sleeve is then hardened after which it is slid with the one end first into the bore until the one end abuts the closed end of the bore. The sleeve is then rotated to bring the hole in the sleeve into radial alignment with the clearance hole. A lubrication line is passed through the clearance hole and at least partially into the hole in the sleeve. A releasable closure is applied to the open end of the packing bore to fix the sleeve in the bore.

THE DRAWINGS

A reciprocating pump according to a preferred embodiment of the invention, is illustrated in the accompanying drawings in which.

DETAILED DESCRIPTION

Figure 1:
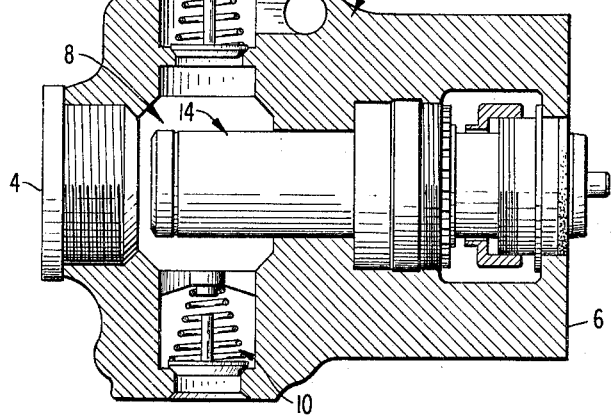
FIGURE 1 is a simplified, side view partially in cross-section of a reciprocating pump according to the preferred embodiment of the invention with a packing compression member forming part of the invention shown in a threaded back condition during an initial stage of assembly of the pump.

Referring to FIGURE 1 of the drawings, a preferred embodiment of the invention there shown includes a reciprocating pump particularly suitable for use in oil field operations such as fracturing, grouting and the like.

The pump includes a longitudinally extending, housing 2 having forward and rear ends 4 and 6 respectively. Adjacent the forward end of the housing 2 is an internal pumping chamber 8 of generally cylindrical configuration provided with transversely extending, diametrically opposed, liquid inlet and outlet valves 10 and 12, respectively. A cylindrical piston 14 concentric with the pumping chamber 8, extends longitudinally thereinto and is mounted for reciprocation inwardly and outwardly of the pumping chamber 8. The piston 14 is of the type comprising a thick walled, hollow cylinder of uniform external diameter, having a closed forward end. A concentric, internal operating rod 15 secured to the forward end of the piston 14 extends rearwardly and outwardly therefrom to suitable reciprocating machinery (not shown). On an outward stroke of the piston 14, liquid to be pumped is drawn in through the inlet valve 10 to the pumping chamber 8. The liquid is expelled from the pumping chamber through the outlet valve 12 on the next succeeding inward stroke of the piston.

Figure 2:
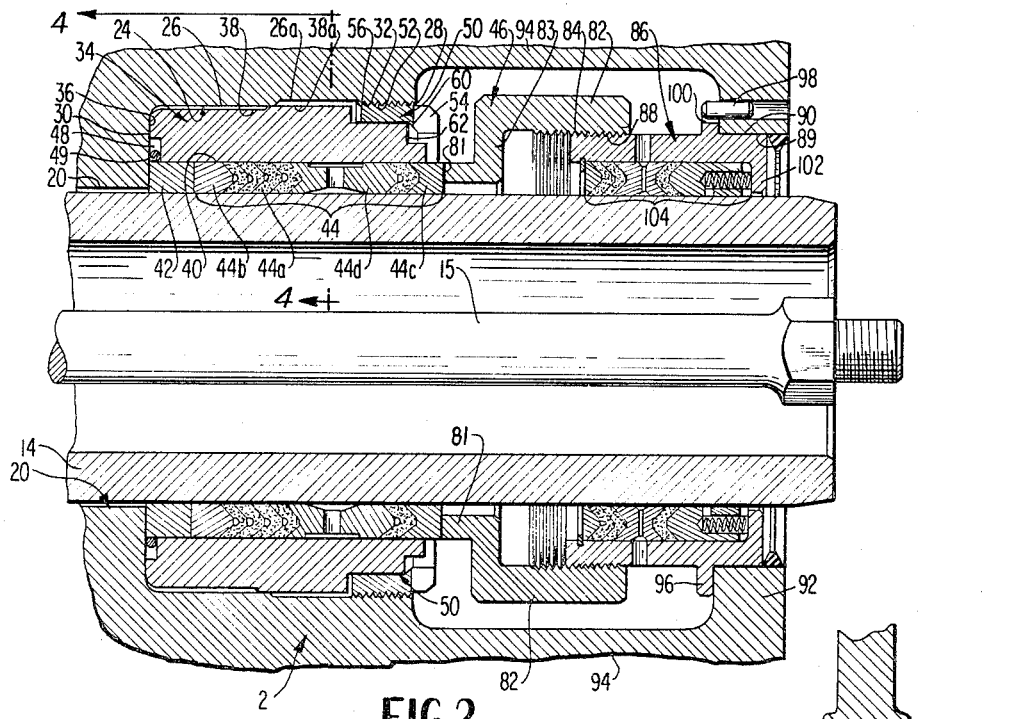
FIGURE 2 is a cross-sectional, side view on an enlarged scale of a portion of the reciprocating pump shown in FIGURE 1, but with a packing compression member threaded forward to an operative compression position.

Of particular interest in the present invention is the provision of packing structure interposed between the housing 2 and the shaft 14 to maintain the liquid-tight character of the pumping chamber 8. Referring to FIGURE 2, the previously mentioned housing 2 includes an axially extending, circular passage 20 concentric with and spaced from the cylindrical piston 14.

The passage 20 adjacent its rearward end opens out into a generally cylindrical packing bore 24. The packing bore 24 is defined by an axially and peripherally extending, internal bore wall 26 of relatively greater diameter than the passage 20, a radially extending, rear end opening 28, and a forward closed end defined by a radially extending shoulder 30 spaced axially forwardly of the end 28. The bore wall 26 adjacent the open end 28 is provided with an internally threaded portion 32.

The packing bore 24 slidably receives a replaceable, annular packing sleeve 34 of hardened metal, having a radially extending forward end 36 abutting the end shoulder 30 of the packing bore. Extending rearwardly from the radial end 36 of the packing sleeve to a point adjacent the commencement of the threaded portion 32 of the packing bore, is an outwardly facing, exterior peripheral surface 38 of the packing sleeve configured generally to conform to the adjacent portions of the bore wall 26. There is a few thousands of an inch clearance (shown deliberately exaggerated in the drawings) between the sleeve and bore to enable the sleeve to be inserted easily into the bore on assembly. To further assist assembly, a rearward portion of the bore wall 26a is made of somewhat greater diameter than the remainder of the bore wall and blends smoothly therewith through an inclined surface of intersection. This construction facilitates easy guiding of the leading end of the sleeve into the bore. A corresponding stepped portion 38a is provided on the rearward portion of the exterior wall 38 of the sleeve.

The packing sleeve 34 includes an internal surface 40 of cylindrical configuration concentric with and spaced radially from the adjacent exterior of the piston 14. The adjacent surfaces of the interior of the sleeve and the piston constitute an axially extending, hollow annular chamber in which is snugly received a rectangular cross-section, annular metal loading ring 42 which abuts the shoulder 30.

A conventional, composite, packing unit 44 extends from the loading ring 42 to a point rearwardly outwardly of the packing sleeve 34. In the preferred embodiment the conventional packing unit comprises a plurality of forwardly facing, compressible chevron packing rings 44a interposed between axially spaced, conventional metal wedging rings 44b, 44c, positioned at the extremities of the unit for expanding the packing rings. Alternatively, serpentine packing material could be used. Interposed among the chevron packing rings 44a is an incompressible metal member 44d having an outer peripherally extending channel communicating with a plurality of peripherally spaced, radially extending ports for the passage of lubricating oil through the packing unit to the shaft. Although one form of conventional packing unit has been described, other well-known forms of packing unit may equally be employed.

The packing unit 44 is axially compressed by a compression member 46, as will be described in more detail hereinafter, so as to cause the sealing portions of the packing unit 44 to be expanded into firm sealing contact against the surfaces of the piston and the packing sleeve. In this manner, the liquid tight character of the pumping chamber 8 is maintained without loss of the liquid being pumped along the exterior of the pumping piston 14.

If some portion of the liquid should be forced, by the high pressure involved, between the packing 44 and the sleeve 34, the rate at which abrasion occurs is reduced by virtue of the hardened qualities of the metal from which the packing sleeve 34 is formed.

With continuing operation, the interior surface 40 of the packing sleeve will nevertheless eventually become worn away by the abrasive action of the leakage liquid to such an extent that the packing 44 can no longer be sufficiently compressed by the member 46 to maintain the required degree of seal. At this time, operation of the pump is suspended and the worn packing sleeve removed (in a manner to be discussed) and replaced by a new packing sleeve. It will be understood that by this construction wherein it is necessary only to replace a relatively inexpensive packing sleeve when it becomes worn rather than to have to replace the whole housing, very considerable economies in pumping operation are achieved.

Another advantage provided by the use of replaceable sleeves of the type described, is that it permits pumping capacity of a unit to be changed by providing sleeves 34 of the same external diameter but differing internal diameters utilized in conjunction with corresponding different pistons of greater and lesser diameter. In this way, a standardized housing can be utilized with pistons of differing diameter, to provide different pumping capacities as necessary.

In another significant feature of the invention, possible creepage of some of the liquid being pumped between the packing sleeve 34 and the packing bore is also prevented. For this purpose an annular, axially extending recess 48 of rectangular cross section is provided in the radial end face 36 of the packing sleeve 34. The recess 48 faces toward the adjacent radial shoulder 30 in the packing bore and extends radially inwardly to the loading ring 42. Position within the recess 48 is a compressible O-ring 49 which is deformingly contacted by the shoulder 30 and the adjacent walls of the recess 48 to provide an annularly extending seal between them preventing passage of any leakage portion of the pumped liquid between the packing sleeve and the packing bore. In this manner, the packing bore is effectively protected against abrasion by leakage fluid so that the housing may continue in use for a long period utilizing successively replaced packing sleeves.

To retain the packing sleeve 34 in fixed location within the packing bore 24, a retainer body 50 is provided. The retainer body is of generally annular form having an externally threaded peripheral portion 52 threadedly engaging the previously mentioned threaded portion 32 of the packing bore. To enable the retainer body to be threaded into the packing bore, a castellated, peripherally extending nut 54, adapted to be engaged by a suitable tool, is formed integrally onto the retainer body 50 and projects outwardly of the packing bore. The retainer body 50 also includes an axially extending, internal peripheral surface 56 generally coextensive with the threaded portion 52 and spaced radially inwardly therefrom. The internal surface 56 abuttingly and snugly contacts a corresponding, axially extending rearward peripheral surface 58 of the packing sleeve 34, spaced rearwardly from the exterior surface 26 thereof and of relatively smaller diameter.

To force the packing sleeve into the packing bore, the retainer body 50 additionally includes a radially inwardly and rearwardly inclined, annular internal shoulder 60 extending away from the rearward extremity of the previously mentioned internal peripheral surface 56. The internal shoulder 60 of the retainer body abuttingly contacts portions of an adjacent end radial surface 62 positioned at the rearward end of the rearward peripheral portion 58 of the sleeve, to fixedly locate the packing sleeve in the packing bore. The inclined, or frustoconical nature of the shoulder 60 provides a wedging and self-centering action on the sleeve to prevent any radial looseness of the sleeve in the packing bore due to the previously mentioned clearance.

Figure 4:
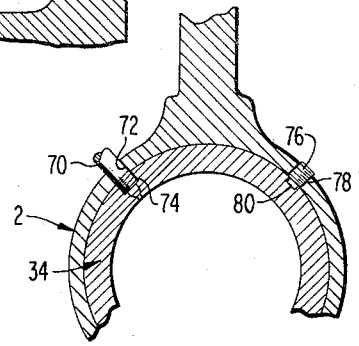
FIGURE 4 is a cross-sectional end view of a portion of the pump shown in FIGURE 3, taken along the line 4—4 therein and illustrating a lubrication connection.
Figure 3:
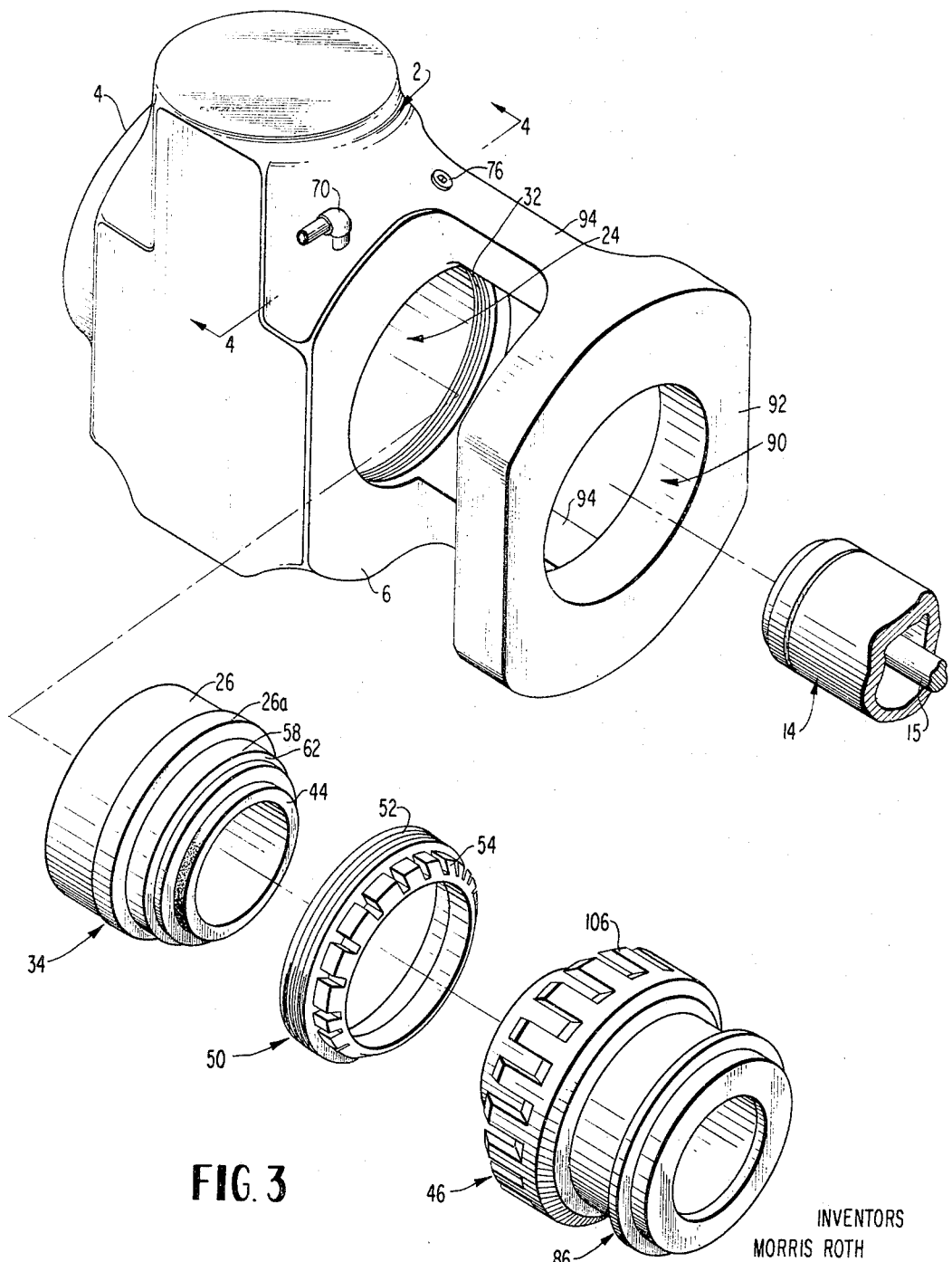
FIGURE 3 is an exploded perspective view of the pump shown in FIGURE 1.

The use of a separate retainer body 50 to hold the packing sleeve in place particularly facilitates subsequent connection of a lubrication line to the packing unit, in a manner to be described. A lubrication line 70 (FIGURE 3) for supplying lubrication to the packing and piston is provided. The lubrication line 70 passes through a clearance hole 72 which extends radially through the housing and intersects the packing bore 24 at a predetermined axial spacing from the closed end 30 thereof as shown in FIGURE 4. (The axial location at which section 4—4 is taken is illustrated in FIGURE 2, although the lubrication line 70 and stop 76, shown in more detail in FIGURE 3, are omitted from FIGURE 2 for clarity of illustration.) When utilizing a packing unit 44 of this type previously described, which includes the incompressible spacing member 44d provided with oil passages, the axial location of the clearance hole 72 is in alignment with the spacing member 44d. At its free end, the lubrication line 70 is threaded and engages a threaded hole 74 extending radially through the packing sleeve 34 so that lubricant may be delivered to the interior of the packing sleeve.

To further secure the packing sleeve 34 against rotation and axial displacement relative to the packing bore, a threaded stop member 76 is threadedly engaged with a correspondingly threaded stop hole 78 in the housing 2 located in fixed space relation relative to the clearance hole 72 for the lubrication line. The inward end of the stop member 76 engages a location opening 80 in the packing sleeve located in corresponding predetermined relation to the lubrication hole 74.

In the manufacture of the unit, the threaded lubrication hole 74 for the lubrication line and the location opening 80 for the locating screw are produced in the sleeve 34 by conventional boring and tapping methods while the metal of the sleeve is in an initially unhardened state. After the openings have been produced in their predetermined location, the packing sleeve 34 is hardened utilizing conventional metal hardening methods. On assembly, the packing sleeve 34 is slid axially into the packing bore 24 until the radial end 36 of the packing sleeve abuts the shoulder 30 of the packing bore. At this time, the openings 74 and 80 in the sleeve are located axially with the holes 72 and 78 in the casing. The packing sleeve is then rotated to bring the openings 74 and 80 into radial alignment with the holes 72 and 78 so that the locating screw 76 may be threadedly engaged with the housing to locate the packing sleeve in the packing bore. The holes 72 and 74 are thus concentrically aligned for reception of the lubrication line 70. Finally the retainer body 50 is threaded into the packing bore 24 to retain the packing sleeve 34 securely therein.

It will be seen that this method of manufacture enables a hardened metal packing sleeve to be utilized despite the requirement that provision be made for passing a lubrication line through the housing and sleeve. This obviates disadvantages of other methods, such as drilling through the packing sleeve in situ, which would necessitate the use of an unhardened packing sleeve which would be more rapidly abraded.

As previously mentioned, compression of the packing unit is effected by the compression member 46 (FIGURE 2). The compression member 46 comprises an annular body concentrically surrounding and spaced from, the piston 14. The compression member 46 includes an annular forward ring 81 having an external diameter generally equal to that of the interior of the packing sleeve 34 and an interior diameter greater than the diameter of the piston 14. The forward ring 81 has a flat radial forward surface 81 abuttingly contacting the adjacent end of the packing unit 44. Supporting the forward ring 81 is an annular, rearward ring 82 of substantially greater internal and external diameters connected integrally with the forward ring by a radial web 83. The rearward ring 82 includes an internally threaded, peripheral portion 84.

Support for the compression member 46 is provided by an annular mounting member 86 concentric with and spaced about the piston 14. The mounting member 86 has an externally threaded forward peripheral portion 88 engaging the internally threaded portion 84 of the compression member. A rearward peripheral portion 89 of the mounting member 86 is of uniform external diameter and is slidably received within a circular bore 90, concentric with the piston 14, provided in a radially extending end plate 92.

The end plate 92 includes a flat radial forward surface maintained in fixed spaced relation rearwardly of the open end 28 of the packing bore 24, by two diametrically opposed, axially extending webs 94. The webs 94 and the end plate 92 together constitute bridging means formed integrally with the casting 2 during manufacture of the castings.

To locate the mounting member 86 at a fixed axial spacing from the open end 28 of the packing bore, an abutment ring 96 is formed on the exterior of the mounting member 86 projecting radially outwardly therefrom at a predetermined spacing from the rearward end of the mounting member. The abutment ring 96 abuts the adjacent flat face of the end plate 92 to maintain the position of the mounting member. Radial movement of the mounting member 86 relative to the end plate 92 is prevented by an axially extending locating pin 98 projecting forwardly from the surface of the end plate 92 and engaging a notch 100 provided in the abutment ring 96.

The mounting member 86 also includes a radially, inwardly projecting rear flange 102 at the rear end of the mounting member to retain a conventional wiper packing unit 104 interposed between the mounting member and the adjacent surface of the piston 14. The wiper packing unit 104 wipes any liquid from the surface of the piston which may be present on it.

To compress the packing, the compression member 46 is progressively unthreaded from the mounting member 86 by use of an appropriate tool engaging castellated portions 106 (FIGURE 3) provided on the exterior of the compression member 46. This causes the combined overall length of the compression member and mounting member to increase, with the result that the forward radial surface 81 of the forward ring 81 is advanced toward the packing bore 24 to compress the packing unit 44, thus increasing the seal about the piston.

In assembling the apparatus (FIGURE 3), the piston 14 is initially removed from the housing 2. The packing sleeve 34 in an assembled condition with the O-ring 49, the loading ring 42 and the packing unit 44, is advanced radially between the housing 2 and end plate 92 into alignment with the packing bore 24 and then slid axially into the packing bore. The packing sleeve 34 is then rotated in the packing bore 24 to align the lubrication and locating openings 74 and 80 in the sleeve with the corresponding openings in the housing and the stop member 76 is inserted as previously described. The retaining body 50 is then threaded into the open end of the packing bore to fixedly locate the packing sleeve in the bore.

The compression member 46 is then threaded onto the mounting member 86 and threading is continued until the compression member substantially overlaps the mounting member to provide reduced overall length (as shown in FIGURE 1). With the compression member 46 and mounting member thus having a minimum combined length, they are then introduced radially between the housing 2 and the end plate 92. The rearward portion 89 of the mounting member 86 is slid axially into the bore 90 until the abutment ring 96 comes up against the adjacent interior end face of the end plate 92 and the locating pin 98 is engaged with the slot 100 in the abutmnet ring to prevent radial rotation of the mounting member. The compression member 46 is then unthreaded from the mounting member 86 until the forward radial end 89 of the compression chamber loosely contacts the adjacent portion of the packing unit 44.

At this time the piston 14 is slid through the mounting member, through the compression member, through the packing unit and through the loading ring into the housing 2. Further unthreading of the compression member 46 from the mounting member 86 is then effected to compress the packing into sealing engagement between the packing sleeve and the piston 14.

It will be appreciated that the manner of assembly described utilizing transverse access to the packing bore is of extreme value utilizing multiplex oil field pumps where adjacent fluid ends which may continue to operate during servicing of a damaged fluid end, would preclude access to the damaged fluid end from an axial direction.

SUMMARY OF ADVANTAGES

It will be seen that following the method and apparatus of the present invention, significant advantages are provided.

For example, substantial economies are effected by providing a relatively inexpensive packing sleeve which, when it becomes worn by abrasive fluid creeping around the packing, may be replaced with another rather than requiring replacement of the whole housing.

In addition, the use of a packing sleeve formed of hardened metal capable of resisting abrasion for longer periods than the metal of the housing, permits the pump to function for longer periods without breakdown.

Also significant is the use of interchangeable packing sleeves of different internal diameter to be used in conjunction with different pistons of greater or less diameter, thus permitting the pumping capacity of the unit to be easily changed.

Other advantages are provided by utilizing a distinct and separate retainer body to retain the packing sleeve in the packing bore. This facilitates subsequent location of the lubrication hole in the packing sleeve in alignment with the clearance hole in the housing.

Although one preferred embodiment of the invention has been described, it will be appreciated by those skilled in the art that numerous additions, deletions, substitutions, modifications and other changes not specifically shown or described may be made which may fall within the purview of the appended claims.

We claim:

1. A reciprocating pump comprising:
    a housing having,
        a piston passage,
        an axially extending pumping chamber communicating with said piston passage;
    a piston movably mounted in said housing extending partially into said chamber for axial reciprocating motion relative thereto;
    a packing bore in said housing surrounding said piston, said packing bore having,
        a closed radial end within said housing,
        an open radial end facing outwardly of said housing;
    a replaceable packing sleeve including,
        an exterior surface abuttingly contacting adjacent portions of said housing defining said packing bore,
        an interior surface generally parallel to and spaced from said piston,
        at least one peripherally extending recess in said exterior surface,
        a compressible, annular seal ring partially received within said recess sealingly contacting adjacent portions of said housing defining said packing bore;
    wall means defining an installation and service passage extending laterally of the axis of said piston passage, said replaceable packing sleeve being operable to pass sequentially through said installation and service passage and portion of said piston passage;
    retaining means for axially securing said packing sleeve in said packing bore; and
    compressible packing means interposed between said piston and said packing sleeve.

2. A reciprocating pump as defined in claim 1 wherein said piston is of generally cylindrical configuration and said packing bore is of generally circular cross-section, said sleeve further including,
    a generally tubular, hardened metal sleeve body concentric with and slidable into said packing bore through said open end until one radial end of said body abuttingly contacts said closed end of said packing bore;
    said packing bore further including,
        an axially extending, internally threaded portion adjacent said open end;
    said retaining means comprising,
        an annular retaining body concentric with said packing bore having,
            an externally threaded, exterior peripheral portion engaging said threaded portion of said packing bore to cause relative movement of said retaining body toward said bore upon threading motion, and
            an internal, radially extending shoulder abutting an adjacent, other radial end of said sleeve body.

3. A reciprocating pump as defined in claim 2 further including,
    a radially extending lubrication hole in said sleeve body,
    a radially extending, clearance hole in said housing intersecting said packing bore, said holes being radially and axially aligned when said sleeve is located in said bore; and
    a lubrication line passing through said clearance hole and at least partially into said lubrication hole for delivering lubricant to the interior of said sleeve body.

4. A reciprocating pump comprising:
    a housing having,
        an axially extending pumping chamber;
    a piston movably mounted in said housing extending partially into said chamber for axial reciprocating motion relative thereto:
    a packing bore in said housing surrounding said piston, said packing bore having,
        a closed radial end within said housing,
        an open radial end facing outwardly of said housing;
    a replaceable packing sleeve including,
        an exterior surface abuttingly contacting adjacent portions of said housing defining said packing bore,
        an interior surface generally parallel to and spaced from said piston,
        at least one peripherally extending recess in said exterior surface,
        a compressible, annular seal ring partially received within said recess sealingly contacting adjacent portions of said housing defining said packing bore;
    retaining means for axially securing said packing sleeve in said packing bore;
    compressible packing means interposed between said piston and said packing sleeve;
    an annular mounting member surrounding and spaced from said piston, said mounting member having,
        an externally threaded peripheral portion;
    bridging means releasably connected with said mounting member and fixedly connected with said housing for supporting said mounting in fixed spaced axial relation from said open end of said bore,
    an annular compression member surrounding and spaced from said piston, said compression member including,
        one axial end portion abuttingly contacting said packing,
        an internally threaded opposite axial end portion overlapping and threadedly engaging said threaded portion of said mounting member, said compression member upon axial unthreading motion from said mounting member causing axial compression of said packing.

5. A reciprocating oil field pump as defined in claim 3 further including,
    a radially extending location opening in said sleeve body,
    a radially extending stop hole in said housing aligned with said locating opening in said sleeve when said lubrication and said clearance holes are in alignment; and
    a radially extending stop member engaging said location opening and stop holes.

6. An oil field, multiplex pump comprising:
housing means;
wall means defining a piston passage;
piston means mounted for telescoping and reciprocating movement within said piston passage;
first packing means encircling piston means;
metallic sleeve means telescopingly mounted within said passage and encircling said first packing means;
conduit means penetrating said housing means and said sleeve means and operable to deliver lubricant material to said first packing means;
elastomeric seal means interposed axially between one end of said sleeve means and said housing means;
packing compression means spaced axially from said passage and compressively and axially engaging said first packing means adjacent another end of said sleeve means;
second packing means spaced axially from said first packing means and contained between said piston means and said compression means;
wall means defining an installation and service passage extending laterally of the axis of said passage;
said sleeve means being operable to pass sequentially through said service passage and a portion of said piston passage;
a body of abrasive fluid operable to be cyclicly pressurized by said piston means, with said elastomeric seal means providing a barrier against the passage of abrasive material between said fluid body and the radially facing, outer periphery of said sleeve means; and
holding means urging said sleeve means axially toward said housing means and operable to maintain said seal means functioning as said barrier against the passage of abrasive material.

7. An oil field, multiplex pump comprising:
housing means;
wall means defining a piston passage;
piston means mounted for telescoping and reciprocating movement within said piston passage;
first packing means encircling piston means;
metallic sleeve means telescopingly mounted within said passage and encircling said first packing means;
conduit means penetrating said housing means and said sleeve means and operable to deliver lubricant material to said first packing means;
packing compression means compressively and axially engaging said first packing means adjacent another end of said sleeve means;
second packing means spaced axially from said first packing means and contained between said piston means and said compression means;
wall means defining an installation and service passage extending laterally of the axis of said passage; and
said sleeve means being operable to pass sequentially through said service passage and a portion of said piston passage.

8. An oil field, multiplex pump comprising:
housing means;
wall means defining a piston passage;
piston means mounted for telescoping and reciprocating movement within said piston passage;
first packing means encircling piston means;
metallic sleeve means telescopingly mounted within said passage and encircling said first packing means;
packing compression means compressively and axially engaging said first packing means adjacent another end of said sleeve means;
second packing means spaced axially from said first packing means and contained between said piston means and said compression means;
wall means defining an installation and service passage extending laterally of the axis of said passage; and
said sleeve means being operable to pass sequentially through said service passage and a portion of said piston passage.

9. A method of manufacture of a reciprocating pump provided with a metal packing sleeve positioned in an axial packing bore in a housing of the pump, the packing bore having one closed end and one open end with the housing having a radial clearance hole intersecting the bore at a location spaced axially from the closed end, the method comprising the steps of,
producing a radial hole in the packing sleeve prior to positioning the sleeve in the bore and with the sleeve in an initially unhardened condition and with the hole positioned at an axial spacing from one end of the sleeve equal to the axial spacing of the clearance hole from the closed end of the packing bore,
hardening the metal sleeve,
sliding the sleeve with the one end first into the packing bore until the one end abuts the closed end of the bore,
rotating the sleeve until the hole therein moves into radial alignment with the clearance hole in the housing,
passing a lubrication line through the clearance hole at least partially into the hole in the sleeve; and
applying a closure to the open end of the packing bore to fix the sleeve in the bore.

10. A reciprocating pump comprising:
a housing having,
   an axially extending pumping chamber;
a piston movably mounted in said housing extending partially into said chamber for axial reciprocating motion relative thereto;
a packing bore in said housing surrounding said piston, said packing bore having,
   a closed radial end within said housing,
   an open radial end facing outwardly of said housing;
a replaceable packing sleeve including,
   an exterior surface abuttingly contacting adjacent portions of said housing defining said packing bore,
   an interior surface generally parallel to and spaced from said piston,
   at least one peripherally extending recess in said exterior surface,
   a compressible, annular seal ring partially received within said recess sealing contacting adjacent portions of said housing defining said packing bore;
retaining means for axially securing said packing sleeve in said packing bore;
compressible packing means interposed between said piston and said packing sleeve;
said piston having a generally cylindrical configuration and said packing bore having a generally circular cross-section;
said sleeve further including,
   a generally tubular, hardened metal sleeve body concentric with and slidable into said packing bore through said open end until one radial end of said body abuttingly contacts said closed end of said packing bore;
said packing bore further including,
   an axially extending, internally threaded portion adjacent said open end;
said retaining means comprising,
   an annular retaining body concentric with said packing bore having,
     an externally threaded, exterior peripheral portion engaging said threaded portion of said packing bore to cause relative movement of said retaining body toward said bore upon threading motion, and
     an internal, radially extending shoulder abutting an adjacent, other radial end of said sleeve body;

said shoulder being inclined axially away from said sleeve body at its point of contact therewith to exert a self-centering action upon said sleeve body relative to said retaining body during threading thereof into said packing bore.

11. An oil field multiplex pump comprising:
at least one, axially extending pumping unit including,
a housing,
a cylindrical piston extending axially outwardly of said housing for reciprocating pumping motion relative thereto,
a packing bore surrounding and spaced from said piston extending axially into said housing,
a transverse opening intermediate the axial ends of said housing communicating with said packing bore,
a packing unit movable transversely into said opening for axial alignment with said packing bore, said packing unit being subsequently moved axially into said packing bore, said packing unit including,
 a packing sleeve snugly contacting said bore,
 packing material concentrically positioned within said packing sleeve; and
an axially extensible, annular packing compressor having an initial reduced length in which said compressor may be moved transversely into said opening into axial alignment between said packing unit and adjacent portions of said housing, said packing compressor being subsequently axially extended to compress said packing unit.

12. A reciprocating pump comprising:
a housing having,
 an axially extending pumping chamber;
a piston movably mounted in said housing extending partially into said chamber for axial reciprocating motion relative thereto;
a packing bore in said housing surrounding said piston, said packing bore having,
 a closed radial end within said housing,
 an open radial end facing outwardly of said housing;
a replaceable packing sleeve including,
 an exterior surface abuttingly contacting adjacent portions of said housing defining said packing bore,
 an interior surface generally parallel to and spaced from said piston,
 at least one peripherally extending recess in said exterior surface,
 a compressible, annular seal ring partially received within said recess sealingly contacting adjacent portions of said housing defining said packing bore;
retaining means for axially securing said packing sleeve in said packing bore; and
compressible packing means interposed between said piston and said packing sleeve, said retaining means comprising an annular retaining body having an internal, radially extending shoulder abutting an adjacent, radial end of said sleeve, said shoulder being inclined axially away from said sleeve at its point of contact therewith to exert a self-centering action upon said sleeve relative to the retaining body.

13. A reciprocating pump comprising:
a housing comprised of a relatively soft metal and having,
 an axially extending pumping chamber;
a piston movably mounted in said housing extending partially into said chamber for axial reciprocating motion relative thereto;
a packing bore in said housing surrounding said piston, said packing bore having,
 a closed radial end within said housing,
 an open radial end facing outwardly of said housing;
a replaceable packing sleeve comprised of a relatively soft metal and including,
 an exterior surface abuttingly contacting adjacent portions of said housing defining said packing bore,
 an interior surface generally parallel to and spaced from said piston,
 at least one peripherally extending recess in a radial end face of said exterior surface,
 a compressible, annular seal ring partially received within said recess sealingly contacting adjacent portions of said housing defining said packing bore;
retaining means for axially securing said packing sleeve in said packing bore; and
compressible packing means interposed between said piston and said packing sleeve.

References Cited

UNITED STATES PATENTS

| 824,799 | 7/1906 | Mann | 277—110 |
|---|---|---|---|
| 1,787,317 | 12/1930 | Labus | 277—64 |
| 2,853,321 | 9/1958 | Davey | 277—64 |
| 3,281,155 | 10/1966 | Kauffman | 277—64 |
| 3,276,390 | 10/1966 | Bloudoff et al. | 103—153 |
| 3,416,406 | 12/1968 | McCreery | 92—166 |

HENRY F. RADUAZO, Primary Examiner

U.S. Cl. X.R.

92—128; 103—169, 204; 277—68